(12) United States Patent
Washington

(10) Patent No.: US 9,288,970 B1
(45) Date of Patent: Mar. 22, 2016

(54) BAITER STYLE BODY AND FISHING HOOK

(71) Applicant: Steven William Washington, Petaluma, CA (US)

(72) Inventor: Steven William Washington, Petaluma, CA (US)

( * ) Notice: Subject to any disclaimer, the term of this patent is extended or adjusted under 35 U.S.C. 154(b) by 244 days.

(21) Appl. No.: 13/987,613

(22) Filed: Aug. 13, 2013

Related U.S. Application Data

(60) Provisional application No. 61/810,873, filed on Apr. 11, 2013.

(51) Int. Cl.
*A01K 83/06* (2006.01)
*A01K 83/00* (2006.01)

(52) U.S. Cl.
CPC ............... *A01K 83/00* (2013.01); *A01K 83/06* (2013.01)

(58) Field of Classification Search
CPC ............................ A01K 91/04; A01K 91/18
USPC ............... 43/43.16, 44.2, 44.8, 44.83, 44.98, 43/44.4, 42.37, 42.38
See application file for complete search history.

(56) References Cited

U.S. PATENT DOCUMENTS

| | | | | |
|---|---|---|---|---|
| 831,211 | A * | 9/1906 | Buckingham, Jr. | 43/44.83 |
| 1,156,152 | A * | 10/1915 | Krenrick | 43/44.83 |
| 1,987,531 | A * | 1/1935 | Huntington, Jr. | 24/300 |
| 2,094,267 | A * | 9/1937 | Faria | 43/44.83 |
| 2,577,466 | A * | 12/1951 | Jones | 264/342 R |
| 2,747,320 | A * | 5/1956 | Boland | 43/44.98 |
| 2,992,029 | A * | 7/1961 | Russell | 289/17 |
| 3,184,880 | A * | 5/1965 | Ratte | 43/44.86 |
| 3,193,962 | A * | 7/1965 | Simpson | 43/4 |
| 4,719,717 | A * | 1/1988 | Koestner | 43/44.2 |
| 5,177,895 | A * | 1/1993 | Baron | 43/44.2 |
| 5,218,780 | A * | 6/1993 | Jacobson | 43/44.4 |
| 6,006,468 | A * | 12/1999 | Hnizdor | 43/44.83 |
| 6,516,552 | B2 * | 2/2003 | Hawkins | 43/42.09 |

* cited by examiner

*Primary Examiner* — David Parsley
*Assistant Examiner* — Danielle Clerkley
(74) *Attorney, Agent, or Firm* — Risto A. Rinne, Jr.

(57) ABSTRACT

An apparatus used for maintaining bait or bait fish at a more level attitude when trolling includes a non-stranded wire attached to a hook. A first end of the wire is threaded through an eye of the hook and wrapped around a shank of the hook. A main loop is provided at an opposite second end. The main loop can be modified to include a first upper loop and a second upper loop. The second upper loop is attached to a fishing line and a pin is inserted into a head of the bait fish, through the first upper loop, and through a bottom of a mouth of the bait fish to secure the bait fish to the apparatus. An elastic band maintains the mouth in a closed position. If desired, a single thicker non-stranded wire may be used or an optional trailer hook may be added to any version.

1 Claim, 5 Drawing Sheets

BAITER STYLE BODY AND FISHING HOOK

This patent application claims the Benefit of Priority of Provisional Patent Application Ser. No. 61/810,873 that was filed on Apr. 11, 2013 by the same inventor, Steven William Washington entitled "Custom Made Baiter Style Body and Hooks", and wherein the entire content of the above-identified provisional application is included herein by way of reference.

RESERVATION OF RIGHTS

A portion of the disclosure of this patent document contains material which is subject to intellectual property rights such as but not limited to copyright, trademark, and/or trade dress protection. The owner has no objection to the facsimile reproduction by anyone of the patent document or the patent disclosure as it appears in the Patent and Trademark Office patent files or records but otherwise reserves all rights whatsoever.

BACKGROUND OF THE INVENTION

1. Field of the Invention

The present invention, in general, relates to fishing hooks and, more particularly, to a baiter type body of fishing hook used for holding a bait fish.

A bait fish is a smaller fish used to attract larger predatory fish also known as game fish. The game fish prey on the smaller fish in their natural habitats of oceans, rivers, lakes or streams. For fishermen looking to catch game fish, it is beneficial to use a type of bait that the game fish are accustomed to hunting and eating.

As used herein, the term "baiter body hook" includes any type of hook designed for use with any type of a bait fish.

Bait fish include species of fish that are able to breed rapidly during their short life span thereby providing abundant numbers of fish readily available to be caught and used as bait. Some of the common types of bait fish include minnows, herring, anchovies, sardine, shad, and shrimp. Depending on the type of game fish being sought determines which species of bait or bait fish is best suited. Any preferred type of bait or bait fish may be used with the current invention.

A game fish is a larger and more desirable type of fish. Common types of game fish include salmon, steelhead, trout, and bass. Fishing for game fish has been a long-standing recreational activity as well as a way to provide fresh fish for human consumption. Use of a fish hook with a type of bait used to lure game fish has been used for centuries as a preferred method of attracting the game fish to the fisherman's lines. Any preferred type of game fish may be caught with the current invention.

Prior art types of baiter hooks are made from heavy materials which add additional weight to the bait fish which make the bait fish sink lower than desired. The combination of the weight of the hook and a heavy leader of the prior art baiter hook causes the bait fish to incline in a steep and unnatural fashion in the water as it trolled (i.e. moved). The heavily weighted bait fish is disposed at an incline with the head of the bait fish held considerably higher than the tail. This orientation detracts away from the natural level attitude of a live swimming fish. Accordingly, it will typically be less successful in attracting the attention of the desired game fish.

Ideally, movement of the bait fish through the water will simulate that of a slightly injured fish. However, an excessively steep attitude is unnatural, even for an injured bait fish and is, therefore, to be avoided. A wounded bait fish tends to swim in a level path but may roll around its center longitudinal axis. Therefore, the goal is to get the bait fish to track and roll as naturally, as possible.

As mentioned previously, the game fish is a predatory species and is continuously looking for smaller fish swimming nearby to feast upon. It is advantageous to the fisherman to provide a baited line that simulates natural movement and characteristics of a live or slightly injured fish swimming through the water. Furthermore, a heavily weighted baited line may sink to a deeper depth than where the desired game fish is potentially located. The undesirable steep angle and greater depth is illustrated in the PRIOR ART drawing figure.

For many fishing applications a spherical lead weight is used to lower the bait fish to a predetermined depth. However, an additional length of the fishing line, and/or an additional length of a leader line extends below the lead weight before actual attachment of a prior art type of baiter hook or the current baiter style of fishing hook occurs. The reason for this is to displace the bait fish a predetermined desired distance away from the lead weight. The distance chosen can vary and it may reflect the skill, instinct and intuition of the fisherman. However, the bait fish is not disposed too close to the lead weight. If the bait fish was adjacent to the lead weight, then disturbances in the water that occur as the lead weight is trolled (i.e., moved horizontally through the water) could discourage the game fish from attacking the bait fish.

It is very important that the bait or bait fish, during trolling, be disposed as close as possible to the same height as the lead weight, and not considerably below the lead weight. This is for two primary reasons. The first is that the lead weight is lowered in the water to what is believed to be the ideal fishing depth. Therefore, it is desirable that the bait fish should also be at or very near that depth. The second reason, as mentioned above, is that if the bait fish and prior art baiter hook are heavy, when trolling they will track below the lead weight and at an unnatural angle.

And there is another significant concern and financial expense that plagues the fisherman who uses this type of arrangement. When the game fish strikes the bait fish, a release device that is attached to the fishing line automatically releases the lead weight, which then falls to the bottom of the water, often to the bottom of the sea, bay or ocean if used in salt water. This permits the fisherman to reel in the game fish and experience the force exerted by the game fish without additional weight or resistance caused by the lead weight.

However, every game fish that strikes the bait fish is not necessarily caught by the fisherman. Many game fish are able to throw the hook from their mouth or simply fail to have the hook engage with their mouth. Every time this happens the lead weight, which can cost upwards of several dollars, is lost. This loss increases the cost of the sport. Fishermen, in general, don't mind this expense if a game fish is actually caught for every lead weight that is lost. However, the pain of the lost lead weight is far more acute if the strike by the game fish does not result in landing the game fish.

Therefore, there is an underlying, yet significant need to increase the percentage of game fish that are actually caught (i.e., landed) by the fisherman as compared to the number of strikes that occur. Increasing this percentage decreases the cost of fishing because fewer of the lead weights would be lost when a game fish is not landed.

To increase the percentage of game fish that are caught as compared to the number of strikes requires presenting the bait fish to the game fish in a more natural manner. If this is accomplished, the game fish is more likely to fully swallow the bait fish during the initial strike, thereby significantly increasing the chances of the game fish ultimately being landed.

Prior art baiter hooks fail to present the bait fish in an optimum manner, as described above. This, in turn, results in a greater percentage of game fish warily approaching and cautiously striking the bait fish, if striking the bait fish at all. A wary strike of the bait fish usually results in the game fish biting only a tail portion of the bait fish. This "weak" strike seldom secures the game fish sufficient to actually land the game fish but it often causes a release of the lead weight.

Therefore, there is an important financial need, the conservation of lead weights, that is satisfied by presenting the bait fish to the game fish in a more natural manner. This includes presenting the bait fish in a more level attitude and allowing for a more natural rotation of the bait fish during trolling.

Additionally placing the bait fish onto a baiter hook may be difficult to accomplish for a beginner or novice fisherman. The bait hook must be securely attached to the bait fish to retain the bait fish while the fisherman's line is trolling through the water. A poorly secured bait fish is likely to fall off the baiter hook leaving an exposed hook in the water. A bait-less or overly exposed hook is ineffective in attracting a game fish.

Also, placing a bait fish onto a baiter hook can be time consuming. The fisherman may be baiting a hook in rough waters and exact placement of the bait fish onto the hook may be a difficult task to accomplish. There may also be times when the fisherman only has a short amount of time to bait a hook and quickly get his line into the water before a prized game fish swims away or a school of game fish swim away.

Additionally, prior art types of baiter hooks are difficult to insert through the body of the bait fish. This is because a flexible stranded wire is used with prior art baiter hooks and the flexible wire makes insertion of the leader through the body of the bait fish difficult to accomplish.

It is also important to ensure when a game fish bites through the body of a bait fish, that the game fish does not sever the line which secures the hook.

There are many different types or styles of hooks that are possible. The two most common types include barbed and barbless hooks. Local regulations may determine the type and number of permissible hooks.

The use of various other specialty-designed hooks, as may be desired, are also possible with the current invention, such as circle hooks which are well-known in the fishing arts.

Ideally, an improved baiter style body and fishing hook is adapted for use with any style, any hook size 8/0 and larger to 1/0 and smaller, and any number of hooks.

Accordingly, there exists today a need for a Baiter Style Body and Fishing Hook that helps to ameliorate the above-mentioned problems and difficulties as well as ameliorate those additional problems and difficulties as may be recited in the "OBJECTS AND SUMMARY OF THE INVENTION" or discussed elsewhere in the specification or which may otherwise exist or occur and that are not specifically mentioned herein.

As various embodiments of the instant invention help provide a more elegant solution to the various problems and difficulties as mentioned herein, or which may otherwise exist or occur and are not specifically mentioned herein, and by a showing that a similar benefit is not available by mere reliance upon the teachings of relevant prior art, the instant invention attests to its novelty. Therefore, by helping to provide a more elegant solution to various needs, some of which may be long-standing in nature, the instant invention further attests that the elements thereof, in combination as claimed, cannot be obvious in light of the teachings of the prior art to a person of ordinary skill and creativity.

Clearly, such an apparatus would be useful and desirable.

2. Description of Prior Art

Fish and baiter hooks are, in general, known.

While the structural arrangements of the above described devices may, at first appearance, have similarities with the present invention, they differ in material respects. These differences, which will be described in more detail hereinafter, are essential for the effective use of the invention and which admit of the advantages that are not available with the prior devices.

OBJECTS AND SUMMARY OF THE INVENTION

It is an object of the present invention to provide a baiter style body and fishing hook that can be quickly inserted into a body of a bait fish.

It is also an important object of the invention to provide a baiter style body and fishing hook that includes a rigid wire leader that can be easily inserted into and through a body of a bait fish.

Another object of the invention is to provide a baiter style body and fishing hook that includes a rigid wire leader that is able to withstand biting from a predatory or game fish.

Still another object of the invention is to provide a baiter style body and fishing hook that is durable.

Still yet another object of the invention is to provide a baiter style body and fishing hook that is lightweight.

Yet another important object of the invention is to provide a baiter style body and fishing hook that provides a more level attitude for a bait fish when trolling in water.

Still yet another important object of the invention is to provide a baiter style body and fishing hook that provides increased opportunity to catch a predatory or game fish.

A first continuing object of the invention is to provide a baiter style body and fishing hook that is inexpensive to manufacture.

A second continuing object of the invention is to provide a baiter style body and fishing hook that is easy to assemble.

A third continuing objection of the invention is to provide a baiter style body and fishing hook that may be used with an optional trailer hook or assisted hook.

A fourth continuing object of the invention is to provide a baiter style body and fishing hook that includes a single or double or more loops at a front end for securing a fishing line to the hook to secure a bait fish.

A fifth continuing object of the invention is to provide a baiter style body and fishing hook that may include a plastic insert disposed in a loop at a front end for securing a fishing line and the hook to a bait fish.

A sixth continuing object of the invention is to provide a baiter style body and fishing hook that may include a barbed hook or a barbless hook or any other type of hook.

Briefly, a baiter style body and fishing hook that is constructed in accordance with the principles of the present invention has a main hook of any preferred size or type, whether barbed or barbless that is inserted into any preferred type of bait or bait fish. A solid rigid (i.e., not stranded) wire of any desired length is attached to the hook, as described below. The wire is preferably made from stainless steel and includes a gauge that makes the wire sufficiently strong and rigid for the size and type of game fish being pursued. The wire may include any preferred color, including bright colors, black, brown or camouflage. According to a preferred embodiment, the solid wire includes a first end and an opposite second end. The wire is bent 180-degrees in the middle which provides a top bend. After bending to provide the top bend, the first and second ends are temporarily disposed adjacent to each other. A first section of the wire extends from a middle of the top bend to the first end. A second section of the wire extends from the middle of the top bend to the second end and is generally parallel with respect to the first section. The wire is a continuous length from the first end to the top bend, through the top bend, and to the second end. The first section and the second section are wound around each other one or more times to provide a first winding that is disposed a short distance from the top bend. Alternately, the wire at the top bend could be grasped and twisted with respect to the first and second sections to create the first winding. A main loop of the wire is provided between the top bend and the first winding. The overall length of the main loop is variable but for most applications is approximately an inch in length. A longitudinal length (i.e., a mid-section) of the wire includes a first mid section of the wire that extends from the first winding to the first end and a second mid section of the wire that extends from the first winding to the second end. The first mid section and the second mid section are adjacent and parallel with respect to each other. The main loop is used in a variety of described ways to secure the baiter style body and fishing hook to the bait or bait fish and to attach a fishing line, thereto. The first end and the second end are then both simultaneously inserted through an eye of the main hook along with a short portion of the first mid section and an identical short portion of the second mid section. The first end and a second end of the wire, after passing through the eye of the main hook, are wrapped in a continuous loop in the same direction side-by-side around an upper portion of a shank of the main hook to secure the main hook to the wire. This provides an exceptionally strong inexpensive and easy way of securing the main hook to the wire. If desired, the first and second ends of the wire may be wrapped in a crisscross pattern around the shank of the main hook to secure the wire to the main hook. If desired, a sleeve of any desired material or a shrink-wrap type of material may be placed or crimped over the wound or crisscrossed wire to further secure the wire to the shank of the main hook or to provide a cleaner appearance or feel. If desired, the main loop of the wire can be twisted at its middle a few times to form a first upper loop and an adjacent second upper loop. The first and second upper loops are used to secure the baiter style body and fishing hook to the bait fish and to attach the fishing line, thereto. If desired, instead of using the slightly thinner solid wire that is bent in the middle to include the top bend, it is also possible to use a larger diameter (i.e., thicker) single solid length of wire that includes a first end and an opposite second end. The wire gauges vary from 0.011 or smaller to 0.081 and larger. The first end is inserted through the eye and wrapped around the shank of the hook to secure the hook to the larger diameter solid wire. The second end of the thicker solid wire is looped and similarly used to form the main loop and, if desired, the first and second upper loops, but the larger diameter solid wire does not extend from the main loop or from the second upper loop back to the eye of the hook. Accordingly, when the thicker solid wire is used the second mid-length section of the wire is eliminated. Rigidity of the wire portion that extends forward of the eye is necessary to easily insert the upper end containing the first and second upper loops through the body of the bait fish. For most applications the thinner solid wire with the first and second mid-length sections are generally preferred. This is because the baiter style body and fishing hook is generally lighter when the thinner solid wire is used than when the single length thicker wire is used when providing comparable rigidity. When the baiter style body and fishing hook is properly inserted into the bait or bait fish, the first upper loop is disposed just forward the mouth of the bait or bait fish and is for attaching a fishing line or leader. The second upper loop provides an opening that is disposed in the mouth of the bait or bait fish through which a pin is urged. The pin may or may not be included as a part of the baiter style body and fishing hook. If desired, the first and second upper loops are omitted and a plastic or other type of narrow elongated oval-shaped plate is placed in the main loop and is held in position by tightening of the first winding which causes the main loop to engage with a perimeter groove that is provided in the plate. The plate preferably includes two holes. If desired, instead of winding the first section and the second section around each other to form the main loop or instead of twisting the main loop to provide the first and second upper loops one or more short metal compression sleeves can be placed where desired and crimped to create a modified main loop and/or a modified first upper loop and/or a modified second upper loop. The modified main loop and/or the modified first upper loop and/or the modified second upper loop are otherwise identical to the main loop and the first and second upper loops. During use, the main loop, or the first and second loops, if included, along with the plate, if included, are inserted into an anus or other opening provided on the bait fish and are urged through the longitudinal length of the body of the bait or bait fish and out through the mouth. The pin is inserted through a top of the bait fish's head and into alignment with and through a center opening of the second upper loop provided in the wire or through a rear hole provided in the plate that is disposed in the mouth of the bait fish or through a rear portion of the main loop. A small elastic band, preferably made from an elastomeric material is then placed around the bait fish's mouth to keep the mouth and gills closed while the bait fish is trolled through the water. The band helps ensure that proper positioning of the baiter style body and fishing hook inside the body of the bait fish is maintained. A portion of the curvature, a pointed end of the main hook body, and perhaps some of the main hook's body and shank slightly extend out from an underside (i.e., bottom) of the bait or bait fish. If desired, an optional trailer or assisted hook may be attached to the main hook (during manufacture of a modified baiter style body and fishing hook) to provide an additional opportunity to catch the game fish. A snap swivel is preferably attached to the first upper loop or to a front hole provided in the plate. During use, the baiter style body and fishing hook maintains the bait or bait fish in a more level attitude and provides a more natural rotation of the bait or bait fish to help lure the desired type of game fish. Plastic or rubber lures may also be used for another type of bait.

DETAILED DESCRIPTION OF THE INVENTION

Figure 1:
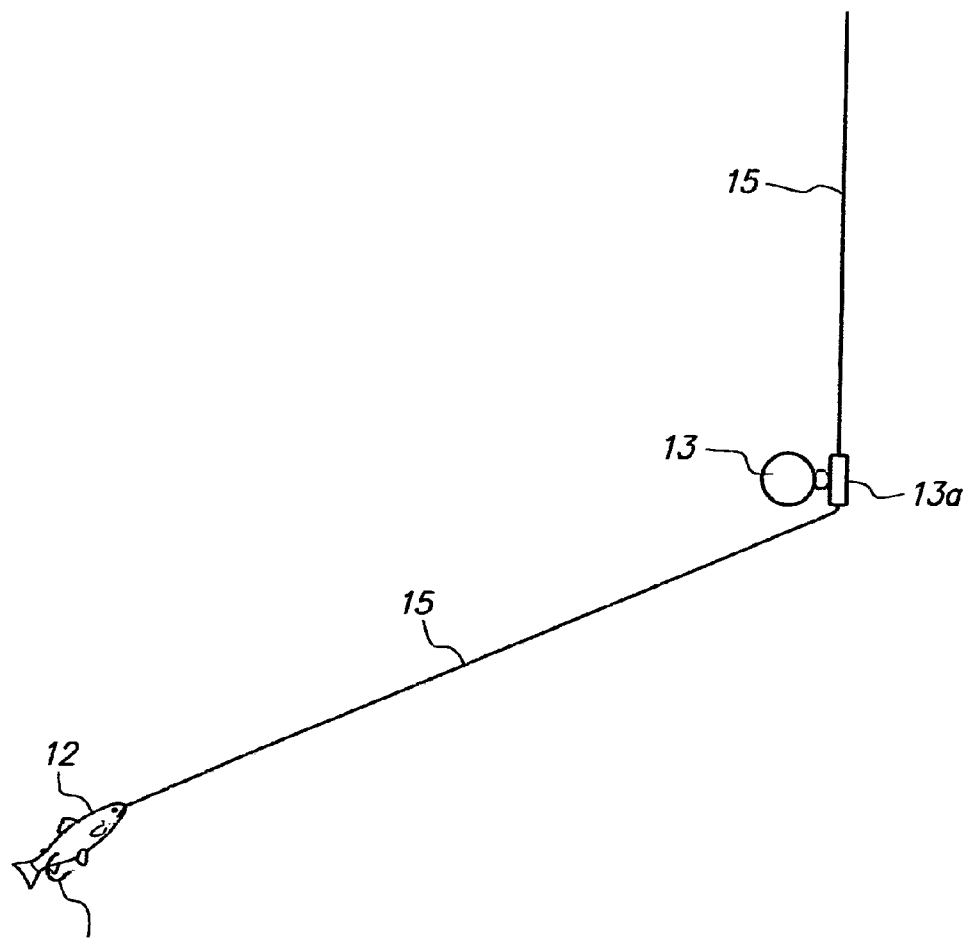
FIG. 1 PRIOR ART drawing is a side view of a prior-art baiter hook inserted into a bait fish being trolled in the water at an inclined angle.
Figure 1A:
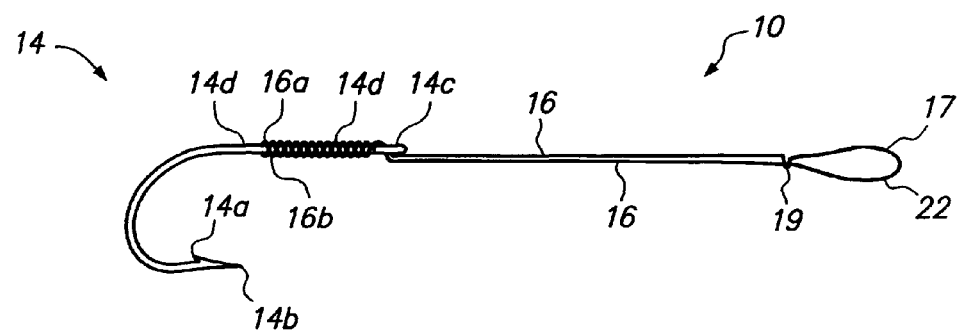
FIG. 1a is a side view of a baiter style body and fishing hook that includes a non-stranded type of wire.
Figure 1B:
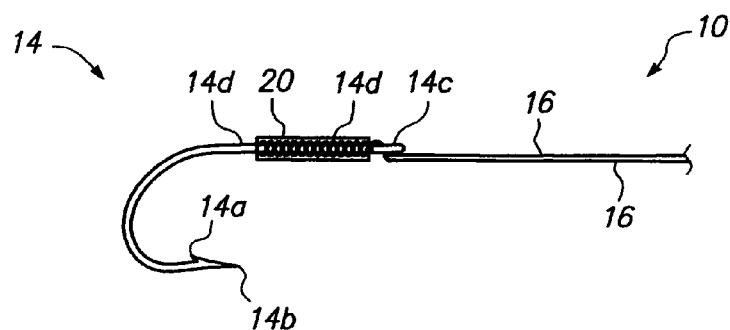
FIG. 1b is a side view of a bottom portion of the baiter style body and fishing hook of FIG. 1a including an optional sleeve disposed around a shank of a main hook.

Referring on occasion to all of the FIGURE drawings and now, in particular to FIGS. 1a and 1b, is shown a baiter style body and fishing hook, identified in general, by the reference numeral 10.

The reader will notice that reference is occasionally made throughout the DETAILED DESCRIPTION OF THE INVENTION suggesting that the reader refer to a particular drawing FIGURE. The suggestion is at times made when the introduction of a new element requires the reader to refer to a different drawing FIGURE than the one currently being viewed and also when the timely viewing of another drawing FIGURE is believed to significantly improve ease of reading or enhance understanding. To promote rapid understanding of the instant invention the reader is encouraged to periodically refer to and review each of the drawing FIGURES for possible cross-referencing of component parts and for other potentially useful information.

Certain examples are shown in the above-identified FIGURES and are described in greater detail below. In describing these examples, like or identical reference numerals may be used to identify common or similar elements.

Fishing for a game fish such as salmon, steelhead, trout, and bass (not shown) has been a long-standing recreational activity and means to provide fresh fish for human consumption. A game fish is a larger predatory fish that feeds on smaller fish. Fishermen typically use a fish hook with a type of game fish bait (i.e., a bait fish) affixed to the hook to lure game fish to the fisherman's lines.

Prior art fishing hooks along with the required fishing accessories such as leaders, weights and swivels typically add additional and unwanted weight to the fishing line. The unwanted weight is undesirable and may cause a fisherman (not shown) to be unsuccessful at fishing due to their lines sinking to lower than desired depths of the water.

Referring to the FIG. 1 PRIOR ART drawing figure, a prior art baiter hook 11 is shown partially disposed inside of a bait fish 12. A lead weight 13 is allowed to lower a fishing line 15 to a proper depth. It is desired that the bait fish 12 also be at approximately the same depth as the lead weight 13. A release mechanism 13a is attached to the fishing line 15 a predetermined distance away from where the prior art baiter hook 11 is disposed. The release mechanism 13a is configured to release its hold of the lead weight 13 when a game fish strikes the bait fish 12. This causes the lead weight 13 to fall to the bottom of the water, where it is lost. Every time the lead weight 13 is disengaged from the release mechanism 13a, it is lost and the fisherman must replace the lead weight 13, at considerable expense, whether the game fish is actually landed or not.

Prior art baiter hooks 11 are typically made from a heavy flexible stranded wire which adds additional weight to the bait fish 12 that is placed onto the prior art baiter hook 11. The heavy weight of the prior art baiter hook 11 causes the bait fish 12 to sink to a depth in the water that is lower than desired. The weight of the prior art baiter hook 11 causes the bait fish 12 to incline in a steep and unnatural fashion in the water as it trolled (i.e. moved). The heavily weighted bait fish 12 is disposed at an incline with a head of the bait fish 12 held higher than a tail of the bait fish 12, which deters game fish from approaching the bait fish 12.

Figure 12:
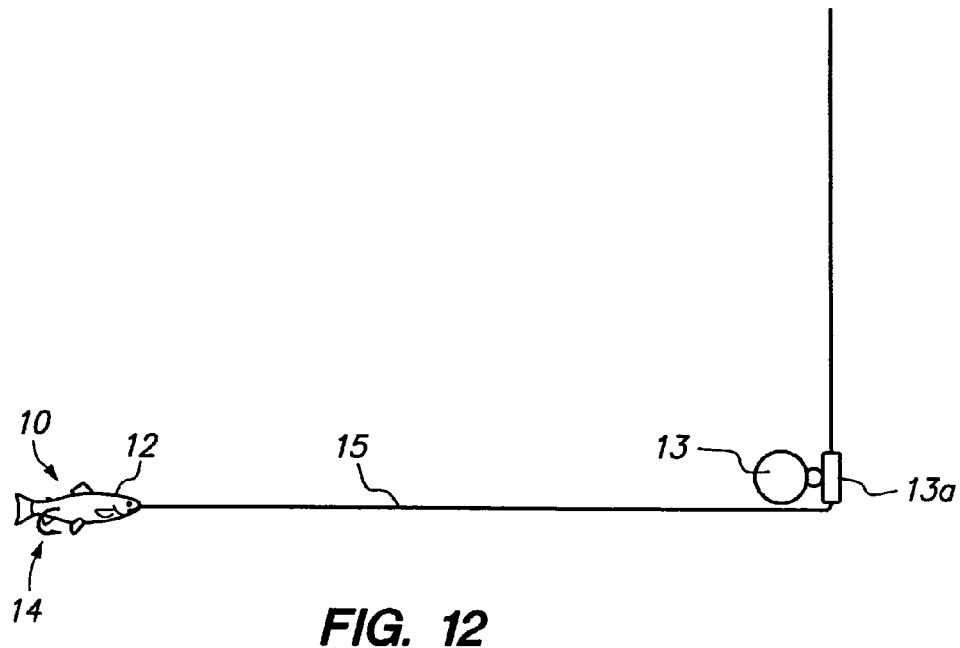
FIG. 12 is a side view of the baiter style body and fishing hook of FIG. 1a inserted into the bait fish as it is being trolled in the water at a desired near-level attitude.

Referring momentarily to FIG. 12, the baiter style body and fishing hook 10, by contrast, is designed to be lightweight thereby ameliorating the aforementioned problems associated with prior art baiter hooks 11. The lightweight design of the baiter style body and fishing hook 10 provides an important benefit over the prior art baiter hook 11. Because the baiter style body and fishing hook 10 does not include the heavy materials that comprise the prior art baiter hook 11, when trolled the baiter style body and fishing hook 10 assumes a much more natural attitude and does not sink to a depth that is far below the depth of the lead weight 13.

When the bait fish 12 is trolled in a more level attitude it also rolls about its longitudinal axis in a more natural manner. Typically, the bait fish 12 appears as a live, but injured, fish to the game fish. This condition apparently triggers some deep instinct in the game fish compelling the game fish to aggressively strike the injured bait fish 12. However, if the bait fish 12, as presented, does not look "right" to the game fish, this instinct is not triggered and the game fish is likely to either avoid the bait fish 12 entirely or to weakly bite or nibble at a tail section of the bait fish 12.

The baiter style body and fishing hook 10 presents the bait fish 12 in a more natural manner to the game fish which results in more aggressive strikes of the bait fish 12 by the game fish. This, in turn, increases the percentage of game fish that are actually caught (i.e., landed) as compared to the number of strikes that occur. It also significantly decreases the number of the lead weights 13 that are sacrificed without the benefit of compensation that occurs when the game fish is landed.

The baiter style body and fishing hook 10 is comprised from materials, which will be described in greater detail hereinafter, that do not add significant weight to the bait fish 12 while providing a significantly improved ability to insert the baiter style body and fishing hook 10 into the bait fish 12. The lighter baiter style body and fishing hook 10 allows the bait fish 12 to troll through the water at a normal attitude similar to that of a live but perhaps injured swimming fish.

As mentioned previously, the game fish is a predatory fish that preys upon smaller fish as a source of food. The unnatural inclined angle of the bait fish 12 disposed on a prior art baiter hook 11 is likely to be unnoticed or ignored by a game fish swimming nearby. The baiter style body and fishing hook 10 places the bait fish 12 in a natural orientation (see FIG. 12) similar to that of a live swimming fish thus catching the attention of the game fish and causing the game fish to pursue catching and striking the bait fish 12.

Figure 4:
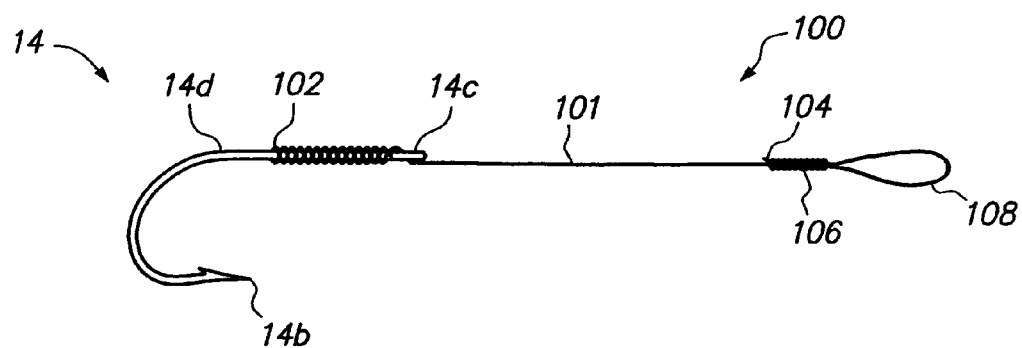
FIG. 4 is a side view of a first modified baiter style body and fishing hook that includes a single length of a thicker type of non-stranded wire.

Several possible versions of the invention are illustrated and described. Now referring again to FIG. 1a and alternately to FIG. 1b, the baiter style body and fishing hook 10 includes a main hook, identified in general, by the reference numeral 14. The main hook 14 may be of any preferred size or type of hook typically used for attaching a desired type of bait. The main hook 14 may include a barb 14a on a point (or pointed end) 14b of the main hook 14. Additionally, the main hook 14 may instead include a barbless hook (as shown in FIG. 4). The barb 14a is an additional sharp point that extends out and away from the point 14b of the main hook 14. The barb 14a is helpful in securing a game fish (not shown) to the main hook 14.

However, use of the barb 14a may be limited. Depending on local fishing jurisdictions, use of the barb 14a on the main hook 14 may be prohibited. Also, some fishing purists may prefer the challenge of "landing" a game fish using a barbless type of the main hook 14.

A solid rigid (i.e., not stranded) wire 16 of any desired length is preferably made from stainless steel and includes a gauge that makes the wire 16 sufficiently strong and rigid for the size and type of game fish being pursued. The larger the game fish being pursued, the larger will typically be the bait fish 12 that is used. To insert a forward portion of the baiter style body and fishing hook 10 through the bait fish 12, as is required, the more rigid the wire 16 will need to be as the size of the bait fish 12 increases. Therefore, the gauge of the wire 16 will increase for larger types and certain species of the bait fish 12.

Also, as the size and/or strength of the game fish increases the gauge of the wire 16 will proportionately need to increase in order to provide greater breaking strength due to the weight and force exerted by the larger game fish and to also provide increased resistance to being severed by a biting action of the larger game fish.

According to a preferred embodiment, the solid wire 16 includes a first end 16a and an opposite second end 16b. The wire is initially bent 180-degrees in the middle which provides a top bend 17. After bending to provide the top bend 17, the first and second ends 16a, 16b are temporarily disposed adjacent to each other. A first section of the wire extends from a middle of the top bend 17 to the first end 16a. A second section of the wire extends from the middle of the top bend 17 to the second end 16b and is generally parallel with respect to the first section of the wire 16.

The wire 16 is a continuous length from the first end 16a to the top bend 17, around the top bend 17, and to the second end 16b. The first section and the second section are wound around each other one or more times to provide a first winding 19 that is disposed a short distance from the top bend 17. Alternately, the wire 16 at the top bend 17 could be grasped and twisted with respect to the first and second sections to create the first winding 19.

A main loop 22 of the wire 16 is, accordingly, provided between the top bend 17 and the first winding 19. The main loop 22 of the wire 16 may be of any preferred length. The length of the main loop 22 may vary depending on the size and type of the bait fish 12 being used on the baiter style body and fishing hook 10. For a common size of the baiter style body and fishing hook 10, the overall length of the main loop 22 is approximately an inch or so in overall length.

The main loop 22 includes an elongated narrow oval, elliptical, or teardrop shape. The main loop 22 is used in a variety of described ways to secure the baiter style body and fishing hook 10 to the bait fish 12 and to attach the fishing line 15, thereto.

The wire 16 includes a first mid section of the wire 16 that extends from the first winding 19 to the first end 16a and a second mid section of the wire 16 that extends from the first winding 19 to the second end 16b. The first mid section and the second mid section are adjacent and parallel with respect to each other.

The first end 16a and the second end 16b of the wire 16 are simultaneously threaded through an eye 14c of the main hook 14 along with a short portion of the first mid section and an identical-length short portion of the second mid section. The overall length of the wire 16 is a variable that depends on the finished distance that is desired between the eye 14c and the top bend 17. The type of game fish being pursued is also a factor in determining the overall length of the wire 16 that is used to form the baiter style body and fishing hook 10.

The first end 16a and the short portion of the first mid section and the second end 16b and the short portion of the second mid section, after passing through the eye 14c of the main hook 14, are wrapped in a continuous loop in the same direction side-by-side (as shown in FIG. 1b) around an upper portion of a shank 14d of the main hook 14 to secure the main hook 14 to the wire 16. Because the wire 16 is formed of a single solid strand, the wire 16 is easily and securely attached to the hook 14 by wrapping the first and second ends 16a, 16b, as described, around the shank 14d. This provides an exceptionally strong, inexpensive and easily manufactured solution for securing the wire 16 to the main hook 14.

This type of attachment is not possible with the prior art baiter hook 11 that uses a stranded type of wire, as the stranded wire is flexible and will quickly unravel off of the shank 14d and be pulled out of the eye 14c during use.

If desired, the first and second ends 16a, 16b of the wire 16 may be wrapped in a crisscross pattern around the shank 14d of the main hook 14 to secure the wire 16 to the main hook 14, as shown in FIG. 1a.

If desired, an optional sleeve 20 of any desired material including metal, plastic, shrink-wrap tubing material or any other desired material may be placed, crimped, or shrunk around the first and second ends 16a, 16b that have been wound or crisscrossed over the shank 14d of the main hook 14 to further secure the wire 16 to the shank 14d of the main hook 14 or to provide a cleaner appearance or feel to the finished baiter style body and fishing hook 10.

Figure 2:
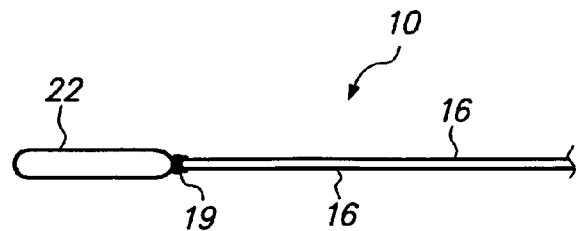
FIG. 2 is a side view of a top portion of the baiter style body and fishing hook of FIG. 1a showing a main loop.

Referring now momentarily to FIG. 2 is shown a top portion of the baiter style body and fishing hook 10. The top portion is maximally disposed away from the main hook 14, which is not shown in FIG. 2. A possible narrow elongated finished shape for the main loop 22 is shown in FIG. 2.

Figure 3:
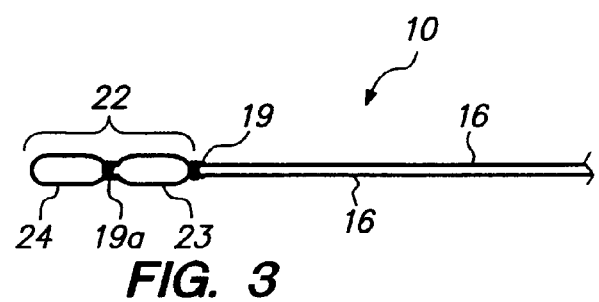
FIG. 3 is a side view of a modified top portion of the baiter style body and fishing hook of FIG. 2 where the main loop has been modified to include a first upper loop and an adjacent second upper loop.

Referring now momentarily to FIG. 3, as desired, the main loop 22 of the wire 16 can be twisted at its middle a few times to include a secondary winding 19a and to form a first upper loop 23 and an adjacent second upper loop 24. The first and second upper loops 23, 24 are used to secure the baiter style body and fishing hook 10 to the bait fish 12 and to attach the fishing line 15, thereto, as described in greater detail, hereinafter.

Referring now momentarily to FIG. 4 a first modified baiter body and fishing hook, identified in general by the reference numeral 100, is shown. Instead of using the slightly thinner solid wire 16 of the baiter style body and fishing hook 10 that is bent in the middle to include the top bend 17, the first modified baiter body and fishing hook 100 includes a larger diameter single strand of a thicker wire 101 that includes a first end 102 and an opposite second end 104.

The first end 102 is inserted through the eye 14c and is wrapped around the shank 14d of the hook 14 to secure the hook 14 to the larger diameter thicker wire 101. The second end 104 of the thicker wire 101 is looped and then wrapped around a portion of the thicker wire 101 to form a modified first winding 106 and to form a modified main loop 108. The type of the hook 14, as shown in FIG. 4, does not include the barb 14a and is therefore commonly referred to as a barbless type of hook. Any version of the invention 10, 100 (and others) may include either a barbed or barbless version of the hook 14.

There are two important needs satisfied by the baiter style body and fishing hook 10 or any modification, thereof. The first is to provide a sufficiently rigid wire 16 (or thicker wire 101) between the hook 14 and the main loop 22 (or the modified main loop 108) to facilitate insertion through a body of the bait fish 12 without bending. The second need satisfied by the invention is to do so at minimum weight which, in turn, allows the bait fish 12 to be trolled in a more level attitude, as shown in FIG. 12. Both the baiter style body and fishing hook 10 and the first modified baiter body and fishing hook 100 accomplish those important and, until now, seemingly opposing needs.

However, for any given degree of strength and rigidity, the baiter style body and fishing hook 10 is usually slightly lighter than the first modified baiter body and fishing hook 100.

Figure 5:
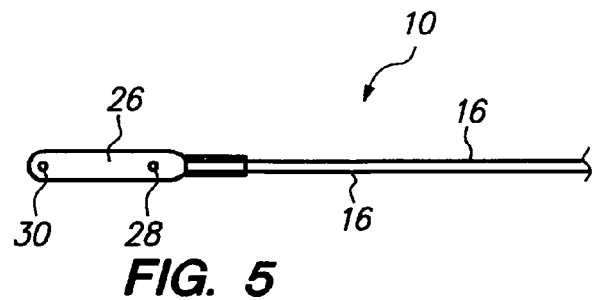
FIG. 5 is a side view of a further modified top portion of the baiter style body and fishing hook of FIG. 1a, or other versions, where a small metal attachment plate has been crimped onto an end of the wire.

Referring now to FIG. 5 is shown a further modified top portion of the baiter style body and fishing hook 10 where a small metal attachment plate 26 has been crimped onto the wire 16 over the main loop 22 or, alternately, crimped over the second end 104 of the thicker wire 101. Crimping of the attachment plate 26 provides an alternative way of securing the bait fish 12 to the baiter style body and fishing hook 10 and of securing the fishing line 15, thereto. The attachment plate 26 includes a lower hole 28 and an upper hole 30 for these purposes, as described in greater detail, hereinafter.

Figure 6:
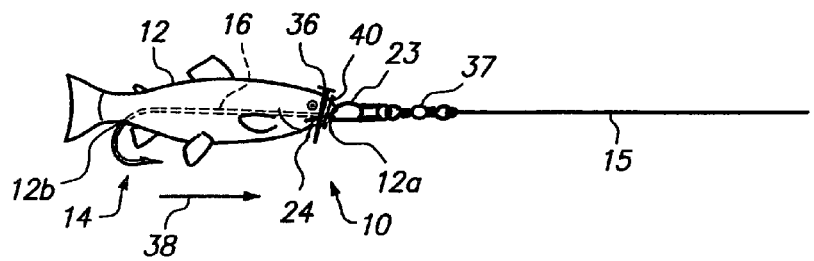
FIG. 6 is a side view of the baiter style body and fishing hook of FIG. 1a disposed inside a bait fish and with a portion of the main hook protruding out of a first location on the bait fish.

Referring now to FIG. 6 is shown the baiter style body and fishing hook 10 of FIG. 1a (with the first and second upper loops 23, 24 of FIG. 3 included) disposed inside the bait fish 12. A portion of the main hook 14 is protruding out of a first location on the bait fish 12. The first location includes an anus 12b of the bait fish 12.

To use the baiter style body and fishing hook 10 the second upper loop 24 is placed in the anus 12b and urged toward a mouth 12a of the bait fish 12 in the direction of arrow 38. A fair amount of force is required to do so. Because of the rigidity of the wire 16, this is easy to accomplish. The prior art hook 11 is especially difficult to insert in this manner because it tends to flex.

A snap swivel 37 is attached at one end to the fishing line 15. An opposite end of the snap swivel 37 is attached to the second upper loop 24. A pin 36 is either included or available elsewhere. The pin 36 resembles a short nail or brad and is urged downward through a top of a head of the bait fish 12 and into the mouth 12a of the bait fish 12. The pin 36 continues through the first upper loop 23 and through a bottom of the mouth 12a. An elastic band 40, similar to a small rubber band, is then placed over the top of the head and under the mouth 12a of the bait fish 12 to maintain the mouth 12a in a closed position. A small wire (not shown) may be used instead of the elastic band 40. The elastic band 40 ensures that the baiter style body and fishing hook 10 will remain in the proper position with respect to the bait fish 12 as the bait fish 12 is trolled in the direction of arrow 38.

Figure 7:
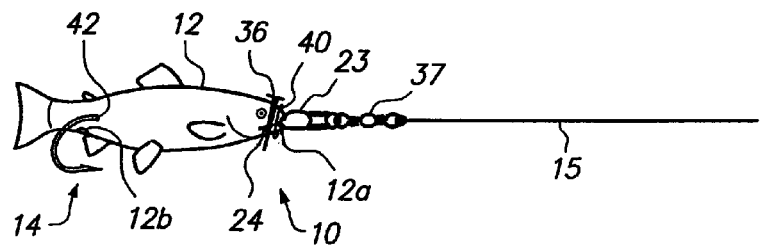
FIG. 7 is a side view of the baiter style body and fishing hook of FIG. 1a with the main hook protruding out of a second location on the bait fish.

Referring now to FIG. 7 is shown the baiter style body and fishing hook 10 of FIG. 1a disposed inside the bait fish 12. A portion of the main hook 14 is protruding out of a second location on the bait fish 12. The second location includes an opening 42 that is provided where desired in the body of the bait fish 12. The opening 42 is typically provided by making an incision, for example with a knife point, into the side of the bait fish 12. The second upper loop 24 is placed in the opening 42 and is urged toward the mouth 12a of the bait fish 12 where it is fastened, as described above.

Use of the opening 42 instead of the anus 12b provides a different look and attitude for the bait fish 12 when it is trolled. Under certain conditions either method or any other variant may be especially effective in attracting the desired game fish.

Figure 8:
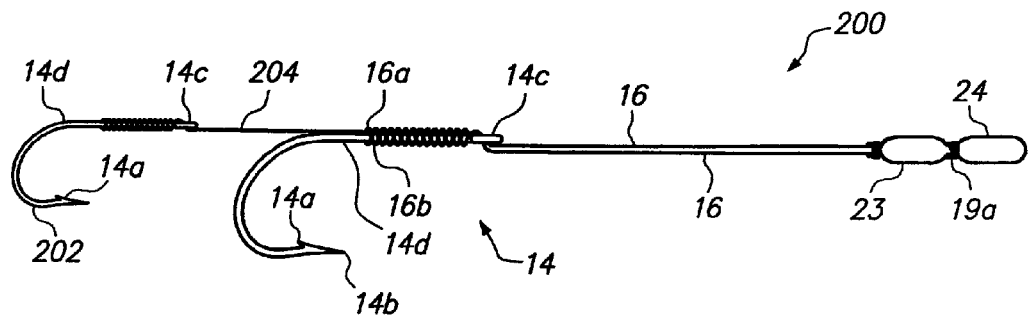
FIG. 8 is a side view a second modified baiter style body and fishing hook with a trailer hook attached, thereto.

Referring to FIG. 8, is shown, a second modified baiter style body and fishing hook 200. A trailer hook 202 includes a short wire section 204 of non-stranded wire. A first end of the wire section 204 passes through the eye 14c of the trailer hook 202 and is wound around its shank 14d to secure it to the trailer hook 202. An opposite second end of the wire section 204 is disposed near the eye 14c of the main hook 14. A length of the wire section 204 extends from the second end of the wire section 204 along the shank 14d of the main hook 14. The first and second ends 16a, 16b of the wire 16 are tightly wound around the shank 14d of the main hook 14 thereby securing the wire section 204 to the main hook 14. The wire section 204 could also pass through the eye 14c of the main hook 14 and be wrapped around the shank 14d of the main hook 14, if stronger attachment was desired.

Figure 9:
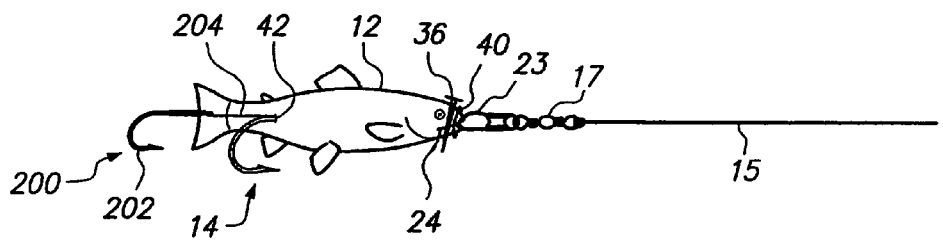
FIG. 9 is a side view of the second modified baiter style body and fishing hook of FIG. 8 attached to a bait fish.

FIG. 9 shows the second modified baiter style body and fishing hook 200 inserted through the opening 42 of the bait fish 12 and attached in a manner similar to that described above. The trailer hook 202 extends behind the main hook 14 and provides another possible location for catching the desired game fish should the game fish fail to be caught by the main hook 14.

Figure 10:
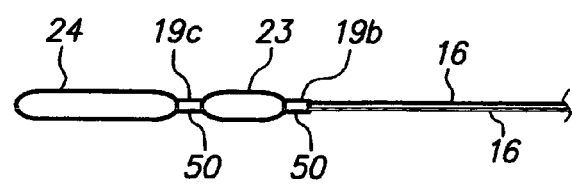
FIG. 10 is a side view illustrating the use of metal compression sleeves.

FIG. 10 is a side view illustrating the use of a plurality of metal compression sleeves 50. The compression sleeves 50 are formed of a short length of metal plate that is wrapped around the wire 16 and crimped in place to provide a modified first winding 19b and a modified secondary winding 19c.

Figure 11:
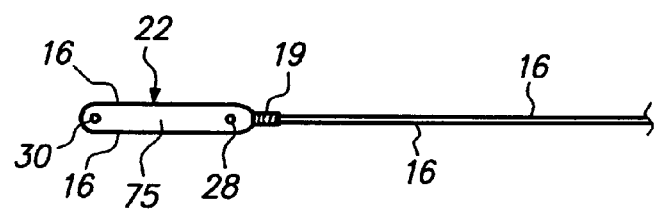
FIG. 11 illustrates a main loop plate disposed in the main loop of FIG. 2.

Referring now to FIG. 11 is shown a main loop plate 75 that is disposed inside the main loop 22 of the wire 16. The main loop plate 75 is preferably made of plastic although metal or any other preferred material may be used. The main loop plate 75 includes a perimeter recess that extends around a perimeter of the main loop plate 75. The wire 16, as it encircles the main loop plate 75, fits inside the perimeter recess and secures the main loop plate 75 inside the main loop 22. During assembly, the first winding 19 is tightened, as needed, to force the wire 16 tightly inside of the perimeter recess. If desired, one of the compression sleeves 50 could be used to secure the main loop 22 in the perimeter recess of the main loop plate 75.

The main loop plate 75 includes the lower hole 28 and the upper hole 30, similar to the metal attachment plate 26. When the baiter style body and fishing hook 10 is properly inserted in the bait fish 12 and either the optional metal attachment plate 26 or the optional main loop plate 75 are included, the lower hole 28 is used to receive the pin 36 which passes there-through, and the upper hole 30 is used for attachment of the snap swivel 37.

As is well known in the fishing art, if the snap swivel 37 is omitted, the fishing line 15 can be attached (i.e., tied) directly to the upper hole 30 of either the metal attachment plate 26, the main loop plate 75, the second upper loop 24 or directly to the main loop 22.

If only the main loop 22 is included, during insertion of the baiter style body and fishing hook 10 into the bait fish 12, the main loop 22 is disposed so that a front portion of the main loop 22 protrudes slightly out of the front of the mouth 12a of the bait fish 12 and a remainder of the main loop 22 is disposed inside of the mouth 12a. Accordingly, when the pin 36 is inserted through the head of the bait fish 12, the pin 36 passes through a rear portion of the main loop 22 and through the bottom of the mouth 12a. The snap swivel 37 or the fishing line 15 is attached to the front portion of the main loop 22.

If desired, devices other than the snap swivel 37 can also be used for attaching the fishing line 15 to the baiter style body and fishing hook 10. Accordingly, numerous means for attaching the fishing line 15 to the baiter style of fishing hook have been described.

During use in water, the baiter style body and fishing hook 10 (including any version, thereof) maintains the bait fish 12 in a more level attitude, as is shown in FIG. 12. It is desirable and most beneficial to the fisherman that the bait fish 12 realistically simulates the natural characteristics of the bait fish 12 that the game fish normally preys upon.

Any version of the baiter style body and fishing hook 10, 100, or 200 helps to provide a more natural rotation of the bait fish 12 during trolling which aids in attracting any desired type of game fish to strike the bait fish 12 that is disposed on the baiter style body and fishing hook 10, 100, 200. Any preferred type of game fish may be caught with any specially designed version of the current invention.

The invention has been shown, described, and illustrated in substantial detail with reference to the presently preferred embodiment. It will be understood by those skilled in this art that other and further changes and modifications may be made without departing from the spirit and scope of the invention which is defined by the claims appended hereto.

What is claimed is:

1. A baiter style body and fishing hook, comprising:
(a) a fishing hook that includes an eye and a shank;
(b) a length of non-stranded wire that is made of stainless steel;
(c) means for attaching a first end of said non-stranded wire to said fishing hook, wherein said length of non-stranded wire includes two lengths of non-stranded wire, and wherein said means for attaching a first end of said non-stranded wire to said fishing hook includes bending said non-stranded wire in half wherein a second end of said non-stranded wire is disposed adjacent to said first end of said non-stranded wire, and wherein said first end and said second end of said non-stranded wire and a portion of said non-stranded wire that is disposed proximate said first end and proximate said second end pass through said eye of said fishing hook and are wrapped around said shank of said fishing hook;
(d) means for attaching a fishing line to an opposite second end of said non-stranded wire, wherein said means for attaching a fishing line to an opposite second end of said non-stranded wire includes a main loop in said non-stranded wire proximate said second end, and wherein said main loop includes a first upper loop and an adjacent second upper loop;
(e) a sleeve that is disposed over a portion of said shank that includes said non-stranded wire;
(f) a pin that is inserted downward through a top of a head of a bait or a bait fish and into a mouth of said bait or said bait fish, through said first upper loop, and through a bottom of said mouth; wherein said first upper loop is placed within said mouth of said bait or said bait fish and disposed above said bottom of said mouth; and
(g) an elastic band or a wire that is placed over said top of said head of said bait or said bait fish and under said bottom of said mouth of said bait or bait fish to maintain said mouth of said bait or said bait fish in a closed position.

* * * * *